Aug. 8, 1944. E. A. EDDY 2,355,210
AIRPLANE RETRACTIBLE TAIL WHEEL OR SKID MOUNT
Filed Oct. 2, 1940 2 Sheets-Sheet 2

INVENTOR
EDWYN A. EDDY
BY
Beau, Brooks, Buckley & Beau.
ATTORNEYS

Patented Aug. 8, 1944

2,355,210

UNITED STATES PATENT OFFICE 2,355,210

AIRPLANE RETRACTIBLE TAIL WHEEL OR SKID MOUNT

Edwyn A. Eddy, Stewart Manor, Long Island, N. Y., assignor to Brewster Aeronautical Corporation, Long Island City, N. Y.

Application October 2, 1940, Serial No. 359,405

3 Claims. (Cl. 244—109)

This invention relates to aircraft and more particularly to an improved retractible type airplane tail wheel or skid mount. The primary object of the invention is to provide an improved form of airplane tail supporting device and retracting mechanism therefor. More specific objects and advantages of the invention will appear in the specification herein.

Figure 1:
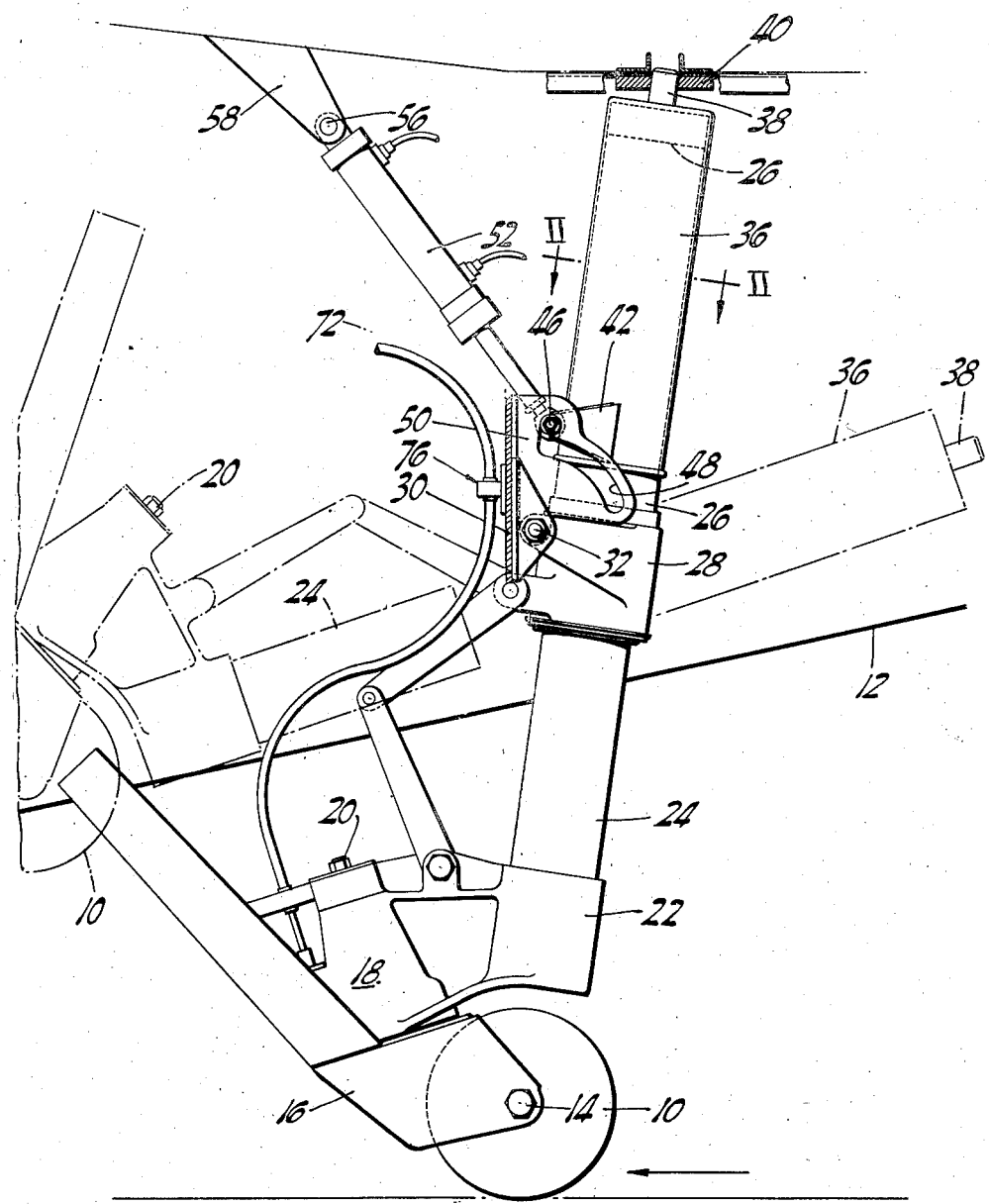
Fig. 1 is a fragmentary side elevation of a tail wheel mounting device of the invention mounted upon an airplane fuselage and illustrating the essential elements thereof when the gear is in extended and retracted positions.

The invention is illustrated in the drawings as mounting a tail wheel 10 upon an airplane fuselage indicated generally by the numeral 12 (Fig. 1). The tail wheel supporting structure comprises essentially a wheel axle 14 engaging at opposite ends with side plates of a fork 16 which is mounted in castering relation below a housing 18 by means of a spindle 20 extending from the fork 16. The housing 18 is provided with a forwardly disposed bracket portion 22 into which is seated the lower end 24 of a shock absorbing type telescopic strut device. The upper end of the shock absorbing strut is provided with a tubular portion 26 into which the lower end 24 thereof is slidably fitted in telescoping relation for the shock absorbing action. The tubular portion 26 is fitted adjacent its lower end with a collar bracket 28 which pivotally engages with a fixed portion 30 of the airplane fuselage through means of a pivot pin 32. Thus, unless otherwise retarded, the shock absorbing strut and wheel unit is freely pivotable relative to the fuselage about the horizontal axis of the pivot pin 32.

A control member in the form of an outer casing member 36 is mounted upon the upper end of the shock strut tube 26 in longitudinally slidable relation thereon and is so formed as to extend beyond the upper end of the tube 26 and terminates in a stud portion 38 extending in line with the longitudinal axis of the shock strut. An apertured plate 40 constituting a stationary portion of the airplane fuselage structure is so arranged that the aperture thereof is in registry with the stud 38 when the gear is in fully extended position.

Figure 2:
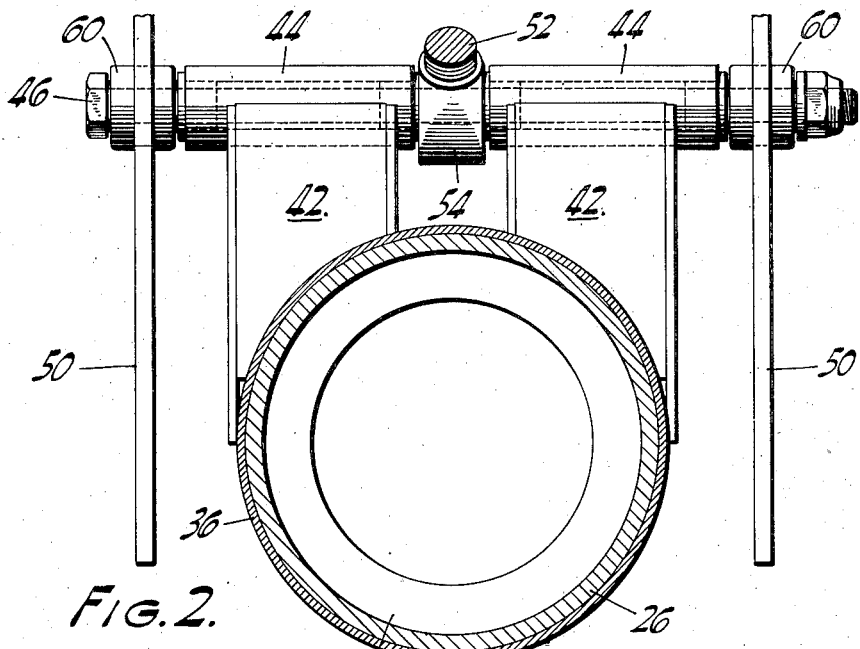
Fig. 2 is a fragmentary section taken substantially along line II—II of Fig. 1.

The casing member 36 is provided adjacent its lower end with a pair of ears 42 extending rearwardly therefrom as integral portions thereof. The ears 42 mount, at their rear ends, a pair of aligned sleeves 44 (Fig. 2) which engage a bolt 46 arranged to extend at its opposite ends into reversely curving slots 48 of corresponding guide end plate members 50 which extend as integral portions of an adjacent stationary structure of the airplane fuselage. A hydraulic jack 52 of the hydraulic cylinder-piston type is arranged in the manner of a diagonal strut relative to the shock strut and is pivotally connected thereto at one of its ends by means of an eye 54 (Fig. 2) and at the other of its ends by means of a pin 56 to a stationary bracket portion 58 of the airplane fuselage. The bolt 46 is provided with roller sleeves 60 in the regions of contact with the end plates 50, and the slots 48 in the end plates 50 are formed as illustrated in Fig. 1 to provide a mode of operation of the mechanism as will be hereinafter described.

Upon introduction of fluid under pressure into the cylinder of the jack 52 the piston device thereof bears laterally and downwardly upon the bolt 46. Because the upper end portion of the slots 48 are vertically disposed the bolt 46 will be restrained thereby from horizontally directed motion but it is free to move downwardly in response to the vertical components of the forces imposed thereon by the hydraulic pressure. Thus, the bolt 46 will initially move only downwardly, and through means of the ears 42 will carry therewith the casing member 36, causing the latter to move longitudinally of the shock strut in such manner as to withdraw the stud 38 from the apertured plate 40. Subsequent to this, the bolt 46 progresses under the impulse of the hydraulic pressure into the lower arcuately shaped portions of the slots 48 which extend somewhat horizontally, whereby the bolt 46 will transmit forwardly directed pressures upon the casing member 36 at a position spaced above the line of horizontal pivoting of the shock strut about the pin 32. Consequently, the shock strut 24—26 will now be rotated toward the broken line position thereof illustrated in Fig. 1 wherein the entire wheel supporting structure is disposed within the contour of the airplane fuselage. Preferably, the retracting movement will be terminated by any suitable stop means prior to total withdrawal of the wheel 10 into the fuselage so that the wheel 10 will partially extend below the fuselage in order to safeguard the latter in case of accidental omission on the part of the pilot to operate the gear to extended position prior to effecting a landing of the airplane.

To move the gear from retracted to extended position the fluid pressure within the jack 52 is reversed, and the bolt 46 is thus drawn upwardly toward its original position during which operation it is guided by the slots 48 in such manner as to reverse the previously described pivoting movement of the wheel strut. The last phase of this operation is such as to finally cause the upper end of the stud 38 to move into registry with the apertured plate 40 and then to cause the casing 36 to slide upwardly relative to the strut 24—26 so as to positively project the stud 38 into the aperture and to anchor the stud within the plate 40.

Thus, the mechanism provides a structure which supports the main wheel strut, when in extended position, at three positions; two of these points of support being through direct connection with stationary portions of the airplane fuselage. Upon release of the locking stud 38 from the fuselage plate 40 and during rotation of the gear toward or away from retracted position the strut is at all times supported at two positions thereon by means of the fixed pin 32 and the jack 52. It will be understood that any suitable form of abutment means may be provided as an integral portion of the fuselage to bear against an end portion of the wheel strut when the gear is in retracted position so as to firmly brace the latter against forces imposed thereon in connection with landings with the gear retracted. Also, any suitable form of additional locking devices may be provided if desired to lock the gear in retracted and extended positions, if desired.

Figure 3:
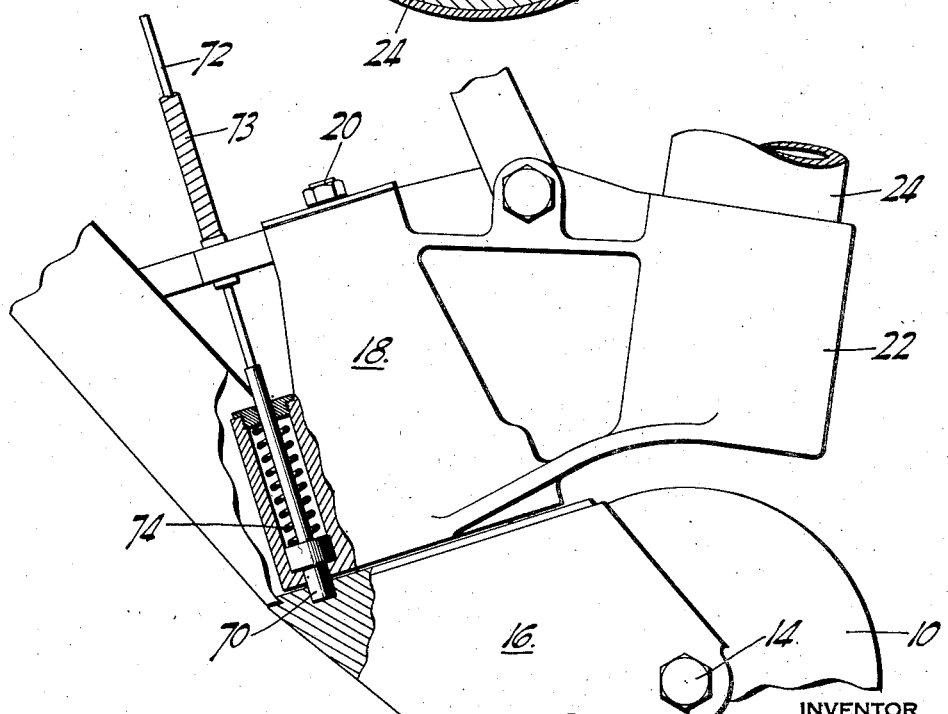
Fig. 3 is a fragmentary side elevation, on an enlarged scale, of a detail of Fig. 1, with portions broken away to show the interior thereof.

The gear of the invention is illustrated herein as being applied to a tail wheel of the full castering type, and means are shown as being provided for full control of the tail wheel in such manner that it may be released for castering and locked in straight-forward position whenever the gear is in its retracted condition so as to eliminate swinging of the wheel and fork relative to the remainder of the gear during normal flight of the airplane. To this end a locking pin 70 (Fig. 3) is slidably mounted within a cored portion of the housing 18 and is provided with an end portion adapted to extend into registry with a complementary opening in an adjacent portion of the fork 16. The pin 70 is connected to one end of a pull cable 72 which is enclosed in a flexible casing 73 and connected at its other end to a manual control device conveniently disposed with respect to the pilot. A compression spring 74 is mounted upon the housing 18 so as to resiliently urge the pin 70 toward engagement with the fork 16. Thus, the wheel fork may be arranged for free castering movement, as during taxiing of the airplane, by proper pilot adjustment of the cable 72.

A guide device 76 for the cable 72 may be mounted as illustrated in Fig. 1 upon a fixed portion of the fuselage and at such position that upon retraction of the gear to the broken line position illustrated in Fig. 1 the cable 72 will be relaxed and thus the pin 70 will be released for engagement with the locking aperture of the fork 16. Inasmuch as the center of gravity of the fork 16 and the wheel 10 is disposed below the axis of the spindle 20 when the gear is in retracted position, the wheel and fork will thereby automatically move under the forces of gravity into an attitude corresponding to a straight-forward position of the wheel, whereby the locking aperture of the fork will come into registry with the pin 70 and the latter will automatically engage therewith under the force of the spring 74. Upon subsequent extension of the gear to landing position the cable will automatically return to its prior condition and the pin 70 will thereby be retracted from the fork 16 against the action of the spring 74, thus leaving the wheel 10 free to caster.

Thus, it will be understood that the invention provides a rugged and simplified retractible gear which is adapted to support a landing wheel or skid or similar device relative to the fuselage in an improved manner throughout the various phases of the gear movement. It will also be understood that the hydraulic jack device 52 illustrated and described hereinabove may be of any suitable type such as is now presently available to airplane manufacturers, and that the pressure supply means and control means therefor may be of any suitable type. Also, that in lieu of the use of the hydraulic jack 52 illustrated and described hereinabove, the required motion may be imparted to the actuating elements of the gear by any other suitable motor device, and that although only one form of the invention has been shown and described in detail, it will be apparent to those skilled in the art that the invention is not so limited but that various changes may be made therein without departing from the spirit of the invention or the scope of the appended claims.

What is claimed is:

1. A retractable tail support mounting for an aircraft comprising a main strut member pivotally mounted by means of a connection device intermediately of its ends to a fixed portion of the aircraft, a tubular control member slidably mounted in telescopic relation upon an end portion of said main strut and having a portion adapted to engage a second connection device at another fixed portion of said aircraft to provide a cantilever mounting of said strut upon said aircraft when said main strut is in extended position, an extensible-contractable strut device mounted at one of its ends upon said aircraft fixed structure and directly connected at its other end to said control member at a position between said connection devices and so disposed as to extend substantially laterally of the direction of said cantilever mounting connection devices and in a direction substantially offset from said first connection device to function as a diagonal brace for said main strut, and a guide device mounted upon a stationary portion of said aircraft and engaging said control member so as to guide the movements of the latter in response to forces of said extensible-contractable strut in such manner as to initially cause said control member to slide within predetermined limits relative to said main strut for disengagement of said control member from said second connection device and to subsequently direct said extensible-contractable strut forces to motivate said main strut pivotally about said first mentioned connection device into a position of retraction within said aircraft.

2. A retractable tail support mounting for an aircraft comprising a main strut member pivotally mounted by means of a connection device intermediately of its ends to a fixed portion of the aircraft, a control member slidably mounted upon an end portion of said main strut and having a portion adapted to engage a second connection device at another fixed portion of said aircraft to provide a cantilever mounting of said strut upon said aircraft when said main strut is in extended position, a motor device mounted upon said aircraft fixed structure and directly connected to said control member at a position spaced from said first connection device and intermediate of said connection devices and so arranged as to impose forces upon said control member in directions laterally of the direction of said cantilever mounting connection devices and at a position substantially offset from said first connection device, and a guide device mounted upon a stationary portion of said aircraft and engaging said control member so as to guide the movements of the latter in response to forces of said motor device in such manner as to initially cause said control member to slide within predetermined limits relative to said main strut for disengagement of said control member from said second connection device and to subsequently direct said motor device forces to motivate said main strut pivotally about said first mentioned connection device into a position of retraction within said aircraft, a pivot shaft carried by said main strut, a landing wheel mounted upon said pivot shaft so as to provide a castering mounting for said wheel, said main strut and said pivot shaft and said wheel being so relatively arranged that the axis of said pivot shaft is disposed above the center of mass of the castering structure when said strut is in its retracted position.

3. A retractable tail support mounting for an aircraft comprising a main strut member pivotally mounted by means of a connection device intermediately of its ends to a fixed portion of the aircraft, a control member slidably mounted upon an end portion of said main strut and having a portion adapted to engage a second connection device at another fixed portion of said aircraft to provide a cantilever mounting of said strut upon said aircraft when said main strut is in extended position, a motor device mounted upon said aircraft fixed structure and operatively connected to said control member at a position spaced from said first connection device and so arranged as to impose forces upon said control member in directions laterally of the direction of said cantilever mounting connection devices and at a position substantially offset from said first connection device, and a guide device mounted upon a stationary portion of said aircraft and engaging said control member so as to guide the movements of the latter in response to forces of said motor device in such manner as to initially cause said control member to slide within predetermined limits relative to said main strut for disengagement of said control member from said second connection device and to subsequently direct said motor device forces to motivate said main strut pivotally about said first mentioned connection device into a position of retraction within said aircraft, a pivot shaft carried by said main strut, a landing wheel mounted upon said pivot shaft so as to provide a castering mounting for said wheel, said main strut and said pivot shaft and said wheel being so relatively arranged that the axis of said pivot shaft is disposed above the center of mass of the castering structure when said strut is in its retracted position, and lock means adapted to automatically move to interlock said main strut and said castering structure when said wheel is disposed in straight forward attitude and only when said strut is in retracted position, and manual control means operably associated with said lock means whereby said lock means may also be manually controllable at will.

EDWYN A. EDDY.